(12) United States Patent
Sonnier et al.

(10) Patent No.: US 11,668,821 B2
(45) Date of Patent: Jun. 6, 2023

(54) POSITION CORRECTION USING TOWED SENSOR

(71) Applicant: Fugro N.V., Leidschendam (NL)

(72) Inventors: Carl James Sonnier, Lafayette, LA (US); Eric Carroll Lissard, New Iberia, LA (US)

(73) Assignee: Fugro N.V., Leidschendam (NL)

( * ) Notice: Subject to any disclaimer, the term of this patent is extended or adjusted under 35 U.S.C. 154(b) by 318 days.

(21) Appl. No.: 16/831,236

(22) Filed: Mar. 26, 2020

(65) Prior Publication Data

US 2021/0302576 A1    Sep. 30, 2021

(51) Int. Cl.
| | |
|---|---|
| *G01S 7/536* | (2006.01) |
| *G01S 7/54* | (2006.01) |
| *G01S 15/89* | (2006.01) |
| *G01S 7/52* | (2006.01) |
| *G01S 7/539* | (2006.01) |

(52) U.S. Cl.
CPC ...... *G01S 15/8902* (2013.01); *G01S 7/52004* (2013.01); *G01S 7/539* (2013.01); *G01S 7/54* (2013.01)

(58) Field of Classification Search
CPC .... G01S 7/539; G01S 15/107; G01S 15/8902; G01S 7/52004; G01S 7/54; G01S 7/6245; G01V 1/3835
See application file for complete search history.

(56) References Cited

U.S. PATENT DOCUMENTS

| | | | | |
|---|---|---|---|---|
| 4,075,599 | A * | 2/1978 | Kosalos | E21C 50/00 367/106 |
| 4,815,045 | A * | 3/1989 | Nakamura | G01S 15/87 342/25 A |
| 7,221,621 | B2 * | 5/2007 | Patterson | G01S 15/8902 382/103 |
| 8,154,952 | B1 | 4/2012 | Gendron et al. | |
| 8,666,118 | B2 * | 3/2014 | Lindholm | G01S 7/6263 382/106 |
| 9,268,020 | B2 * | 2/2016 | Coleman | G01S 7/521 |
| 9,541,643 | B2 * | 1/2017 | Maguire | G01S 15/8902 |
| 11,137,495 | B2 * | 10/2021 | Caspall | G01S 15/87 |
| 2010/0157736 | A1 * | 6/2010 | Riordan | G01S 15/87 367/88 |

(Continued)

FOREIGN PATENT DOCUMENTS

RU    2529207 C1 *  9/2014

*Primary Examiner* — Daniel L Murphy
*Assistant Examiner* — Amie M Ndure
(74) *Attorney, Agent, or Firm* — Polsinelli PC (57) ABSTRACT

Aspects of the subject technology relate to a method of correcting sensor position. The method comprises transmitting one or more first pulses of a first frequency range towards a first portion of a seabed and one or more second pulses of a second frequency range towards a second portion of the seabed, and receiving a first set and second set of backscattered data. The method further includes processing the first and second set of backscattered data to form a first and second set of image data and comparing the first set and second set of image data. The method further includes creating one or more error vectors between the first set and second set of image data, and updating the first set of backscattered data based on the one or more error vectors to produce an updated set of image data.

18 Claims, 5 Drawing Sheets

(56) References Cited

U.S. PATENT DOCUMENTS

| | | | |
|---|---|---|---|
| 2012/0069709 A1* | 3/2012 | Gendron | G01S 7/539 |
| | | | 367/88 |
| 2016/0069988 A1* | 3/2016 | Foote | G01S 15/86 |
| | | | 367/13 |
| 2016/0084947 A1* | 3/2016 | Hogarth | G01S 7/52004 |
| | | | 367/13 |
| 2016/0259051 A1* | 9/2016 | Proctor | G01S 7/524 |
| 2016/0259053 A1* | 9/2016 | Proctor | G01S 15/003 |
| 2016/0259054 A1* | 9/2016 | Proctor | G01S 15/89 |
| 2020/0103524 A1* | 4/2020 | Caspall | G01S 15/8902 |
| 2020/0341140 A1* | 10/2020 | Clark | G01S 15/8902 |

\* cited by examiner

POSITION CORRECTION USING TOWED SENSOR

The present technology pertains to correcting the position of a towed sensor and, more specifically, to correcting the position of a towed sensor by feature matching data from the towed sensor to a vessel mounted sensor.

BACKGROUND

Sidescan sonars (SSS) are used for surveying large areas of the seafloor or seabed. SSS uses a device that emits sonar pulses down toward the seabed across an angle perpendicular to the path of the sensor through the water. Backscatter from the seabed is recorded and stitched together along the direction of motion. This forms an amplitude image of the seafloor within the coverage of the beam. SSS is towed from a platform and transmits acoustical beams that are sent in a wide angular pattern down to the seabed. This current process requires a multitude of scans, along with extensive processing for creating an underwater image of the seafloor.

Underwater images of the seabed provide information on the submarine environment such as migration of sediments, submergence of the ocean floor, and ecological environment. Various correction factors are considered for accurate image matching in matching captured underwater images. Systems can correct the position of a sensor when the sensor coverage overlaps previous sensor passes by observing the same feature in different passes. Systems typically compare data from the same sensor over multiple passes and match data from SSS to SSS and only correct horizontal offsets. Sensor observed navigation augmentation (SONA) and simultaneous localization and mapping (SLAM) techniques assume the same sensor or at least the same sensor type and resolution. Previous techniques do not use two different types of sensors with different frequencies and resolutions to match features.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The disclosed technology is a system and method of correcting sensor position comprising a towing vessel, a towing cable connected to the towing vessel, a sidescan sonar towed by the towing vessel, a multibeam echosounding sonar mounted beneath the towing vessel, and an ultrashort baseline navigation system to calculation a position of the sidescan sonar. One or more first pulses of a first frequency range and one or more second pulses of a second frequency range are transmitted concurrently towards a first portion and a second portion of the seabed, respectively. A respective first and second set of backscattered data is received and processed into image data. The image data is compared and error vectors are created and used to update and correct the position and orientation of the data.

According to at least one aspect, the one or more first pulses are transmitted by a sidescan sonar and the one or more second pulses are transmitted by a multibeam echosounding sonar. The sidescan sonar is towed by a towing vessel and the multibeam echosounding sonar is mounted beneath the towing vessel at a predetermined distance ahead of the sidescan sonar. A pattern matching algorithm is used to determine one or more similar detected features between the first set of image data and the second set of image data and to create an updated set of image data. An image of a topography of the seabed based on the updated set of image data is rendered.

Figure 1A:
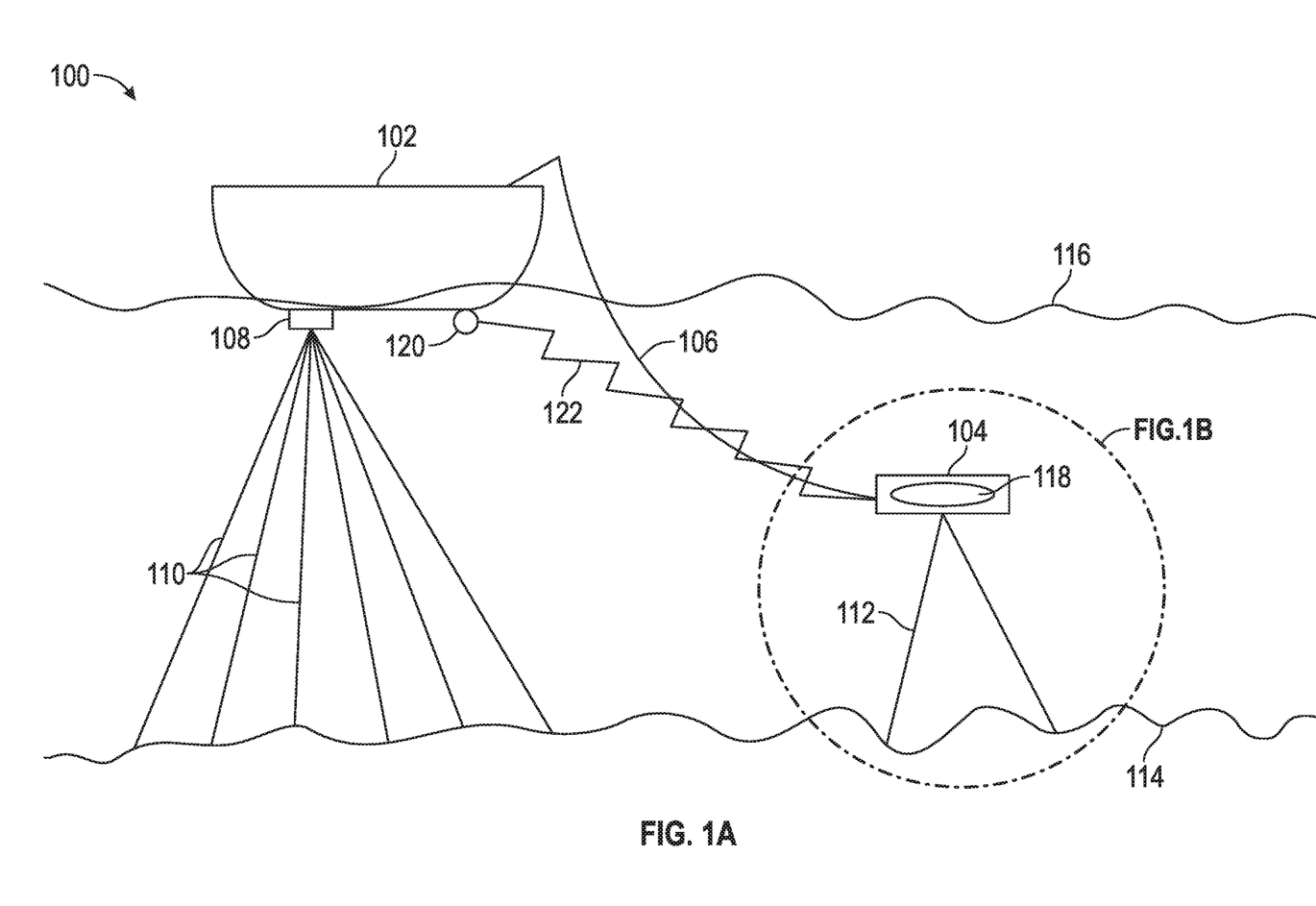
FIGS. 1A and 1B is a schematic diagram illustrating a configuration of an example system of correcting the position of a sensor using towing vessel with a towed vehicle, in accordance with various aspects of the subject technology.

The disclosure now turns to FIG. 1A, which illustrates a configuration of an example system of correcting the position of a sensor using a towing vessel with a towed vehicle, in accordance with some examples of the present disclosure. As depicted in FIG. 1A, system 100 comprises a towing vessel 102, a towed vehicle 104, and a tow cable 106 that connects the towing vessel 102 to the towed vehicle 104. The towed vehicle 104 is at a predetermined tow depth. The towing vessel 102 is at the surface of the water 116. The predetermined tow depth may be, for example, 10-15 meters above the seabed 114. The towed vehicle 104 and the towing vessel 102 can each have respective sensors, such as a sidescan sonar 118 and a multibeam echosounding sonar 108. Data collected from these sensors can be used to create an image of the seafloor being scanned. The sidescan sonar 118 and the multibeam echosounding sonar 108 are of different types and of different frequencies and resolution. In an embodiment, the towed vehicle comprises the sidescan sonar 118. In an embodiment, the towing vessel 102 comprises a near-seabed measurement device in the form of a multibeam echosounding sonar 108.

The towing vessel 102 tows the towed vehicle 104 and may provide power and control signals to the towed vehicle 104. In an embodiment, an underwater positioning system 120 may be used to calculate the position of the sidescan sonar 118. In some examples, the underwater positioning system 120 may be an ultrashort baseline locating system, which utilizes an acoustic pulse 122 to locate and position the underwater vehicle (e.g., the towed vehicle 104). In other examples, the underwater positioning system may be a longbase line system, a Doppler system, an inertial measurement system, etc. In an embodiment, the underwater positioning system 120 can calculate the positions of an underwater vehicle by measuring the range and bearing from a transceiver mounted on the towing vessel 102 to an acoustic transponder fitted to a moving target or placed on the seabed. To calculate a subsea position, the underwater positioning system 120 calculates range and angle from the transceiver to the subsea transponder. An acoustic pulse 122 is transmitted by the transceiver and detected by the subsea transponder that responds with its own acoustic pulse. The time from transmission of the initial acoustic pulse 122 until the reply is detected is measured by the underwater positioning system 120 and is converted into a range. The transceiver (not shown) contains an array of transducers, which are used to measure the angle of incidence.

The towed vehicle 104 includes a chassis (not shown) which may be rectangular in cross-section and elongate having a longitudinal axis. In some examples, the towed vehicle 104 may include a thruster system (not shown), which may include a single thruster or multiple thrusters. In some examples, the towed vehicle 104 may include a steering vane. The thruster may be mounted at the rear of the chassis. In some examples, towed vehicle 104 may include magnetometers and sub bottom profilers.

The multibeam echosounding sonar 108 simultaneously transmits a plurality of transmission beams 110 having different directivities in the direction perpendicular to the seabed 114. The multibeam echosounding sonar 108 can broadly encompasses a transmitter, a receiver, a housing, a memory element, and a processing element (not shown). In the multibeam echo sounding sonar 108, the amplitude of the sound energy received at a number of uniformly spaced solid angles, each of which is referred to as a beam 110, is measured. In an embodiment, there are more than one hundred beams 110. The multibeam echo sounding sonar 108 may provide digitized values for the amplitude of the echo as time series, for example, one time series for each beam 110. The time series recorded for each beam 110 are combined together into a single set of observations for each pulse in order to enhance the image data.

The transmitter receives electronic signals from the processing element and generates a pulse or a short burst of pulses. The receiver receives the reflections of the transmitted beam. A series of calculations on the data is performed at the processing element. The combination of the transmitted beam and the received beams may form beam 110. In an embodiment, the transmitted beam and the received beam overlap. In an embodiment, each beam 110 emanates from a single point. In an embodiment, each beam 110 includes a transmitted beam and one or more received beams. The number of received beams depends on the resolution of the beam 110. In general, the higher the number of received beams, the greater the resolution.

The sidescan sonar 118 comprises a sonar source that emits acoustic pulses towards the seabed 114 across a wide angle perpendicular to the direction of travel of the towed vehicle 104. The sidescan sonar 118 may emit conical or fan-shaped acoustic pulses. The sidescan sonar 118 provides scan coverage of a wide swath of the seabed 114 along a track defined by the direction of travel of the towed vehicle 104. The sidescan sonar 118 comprises an array of sensors that detects the acoustic reflections from the seabed 114. In an embodiment, the towed vehicle 104, in addition to or as an alternative to the sidescan sonar 118, may include other near-seabed measurement devices (e.g., magnetometers or gradiometers). The sidescan sonar 118 provides transmission of a sequence of discrete pulses at sampling intervals that propagate perpendicular to the direction of motion of the towed vehicle 104. The sidescan sonar 118 receives returning echoes and converts the returning acoustic energy into amplitude data. Each beam 112 can correspond to an angle of incidence.

Figure 1B:
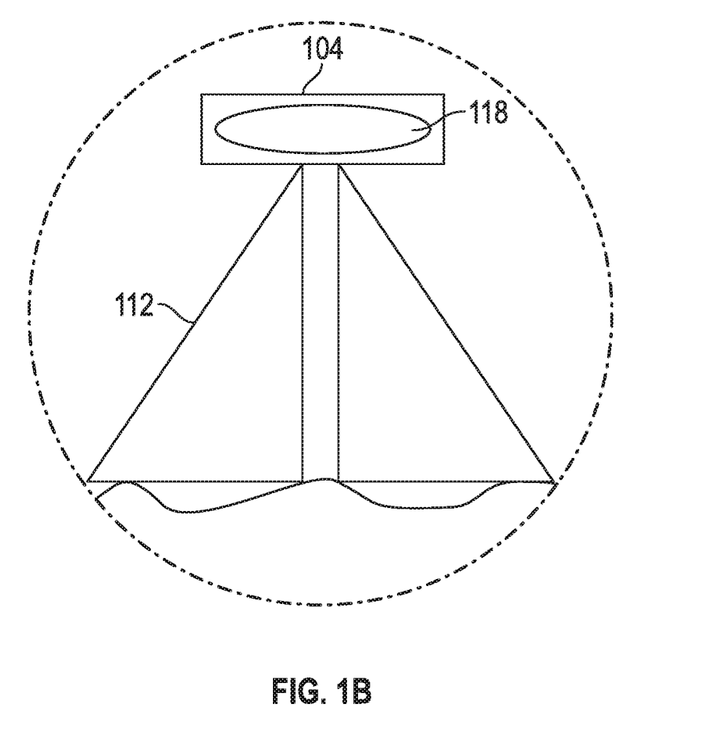

Turning to FIG. 1B, an illustration of an embodiment of the sidescan sonar 118 from FIG. 1A is provided. The sidescan sonar 118 is shown transmitting two fan-shaped beams 112. In some examples, one of the beams 112 is transmitted from the port of the towed vehicle 104 and another beam 112 is transmitted from the starboard of the towed vehicle 104. The port and the starboard beams 112 can be received as a time series.

Figure 2:
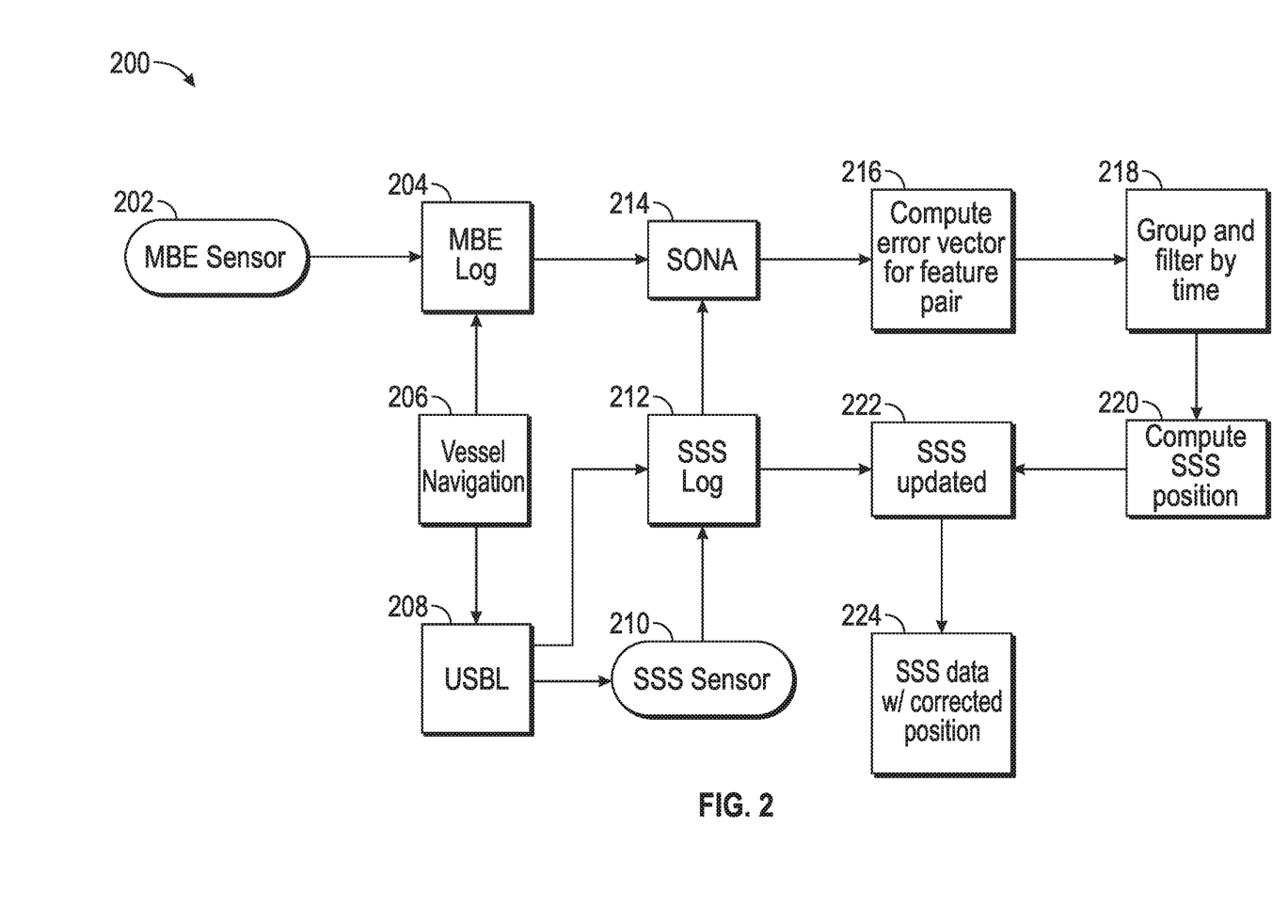
FIG. 2 is a schematic diagram of an example method of correcting the position of a sensor using towing vessel with a towed vehicle, in accordance with various aspects of the subject technology.

Turning to FIG. 2 a schematic diagram of an example method 200 of correcting the position of a sensor using a towing vessel with a towed vehicle is provided, in accordance with various aspects of the subject technology. At 202, the multibeam echosounding sonar 108 is properly positioned on the tow vessel 102. For example, when the multibeam echosounding sonar 108 located much further from the detected features creates relatively small shadows. The multibeam echosounding sonar 108 transfers backscattered data to the MBE log. At 204, the backscattered data from the multibeam echo sounding sonar 108 is used to find clusters of smaller detected features that do not throw shadows. The multibeam backscattered data is image processed for features. The features have less shadow or data gaps than the features of the sidescan sonar 118 because of the geometry of the multibeam echo sounding sonar 108 with respect to the seabed 114 and the features are detected later in SONA at 214.

At 206, the vessel navigation or the underwater positioning system 120 may be utilized to calculate the subsea position of the sidescan sonar 118. The underwater positioning system 120 is optional in this process. At 208, the underwater positioning system 120 determines the location of the sidescan sonar 118 At 210, the underwater positioning system 120 position data and the raw sidescan sonar 118 data is sent to the SSS log and logged into SSS log. The underwater positioning system 120 and the sidescan sonar 118, transmit data back and forth to measure range and distance. At 212, the raw sidescan sonar 118 position data from the underwater positioning system 120 stored in the SSS log and the image data of the sidescan sonar 118 is transmitted to SONA for processing.

At 214, SONA can perform feature matching on the data from the MBE log and the SSS log. The image(s) from the sidescan sonar 118 image data and the multibeam echosounding sonar 108 image data are used to find matched features. In areas of overlap in the sidescan sonar 118 image data and the multibeam echosounding sonar 108 image data, common features are found. The sidescan sonar 118 data set and the multibeam echosounding sonar 108 dataset are compared to find data points that are in the relatively same location. Sections where there are overlap between the two data sets are broken into smaller components. An recognition algorithm can be run on the smaller components to find unique areas, which are then scanned to find the set of pixels with closest match. A network minimized correction model is produced, which can correct the SSS trajectory. In an embodiment, a least squares adjustment method is utilized to correct the SSS trajectory. In some examples, finding matching features may be done by comparing reflection intensity from the towed and vessel mounted systems. In other examples, finding matching features may be done by transforming the surface derived from the multibeam echosounding sonar 108 into a pseudo sidescan sonar 118 record.

Detected features are matched using image processing techniques to find matching features in data collected by different types of sonar sensors and collected at different resolution or detail levels. In an embodiment, imagery from a towed sidescan sonar 118 with backscattered data from a hull-mounted multibeam echosounding sonar 108 is matched. In an embodiment, imagery data from a towed sidescan sonar 118 is matched to a simulated sidescan sonar 118 record created from a bathymetric model made from the multibeam echosounding sonar 108. A simulated sidescan sonar 118 image from the multibeam echosounding sonar 108 utilizes the estimated sidescan sonar 118 position then applies light source shading on the image from the sidescan sonar 118 position which is how the shadows are mimicked. In an embodiment, the light source is placed at the approximate location of the sidescan sonar 118 and shadows and nadir gap are simulated all from the bathymetric data. In an embodiment, the backscattered data is draped onto the light source shaded image to provide an emulation of the towed sidescan sonar 118 image.

The towed sensor and the vessel mounted sensor may be of different types, different frequencies and operated in different geometries (e.g., one hull mounted and shallow and the other towed deep, close to the seafloor). In an embodiment, data is compared from a low resolution (e.g., 20 cm) lower frequency sensor multibeam echosounding sonar 108 operated near the sea surface to a high resolution (e.g., 5 or 10 cm) sidescan sonar 118 operated near the seabed. In an embodiment, the sidescan sonar 118 image is simulated from the multibeam echosounding sonar 108 thus creating a synthetic sidescan sonar 118 record from the multibeam echosounding sonar 108 bathymetry overlayed with multibeam echosounding sonar 108 backscattered data as viewed with the light source located at the approximate sidescan sonar 118 location, which is provided by the underwater positioning system 120 or by dead reckoning based on layback and length of the tow cable.

In an embodiment, feature matching may be done by creating image tiles for the data in the MBE log and the SSS log to create an SSS image and an MBE image. The entire image is split into smaller georeferenced image tiles based on the resolution of the data and the number of corrections desired per distance. Pairs of tiles from the survey lines that share overlapped areas are identified and key points (i.e., spatial locations in the image) may be identified. For each key point, the key point is processed and an error vector is created from the key point in the SSS image to the best match in the MBE image. In one embodiment, the tail of the error vector in the SSS image becomes the head of the error vector in the MBE image for the same feature. Finally, a cluster of the final group of all matched features is created to create the enhanced image.

At 216, the position of the towed sidescan sonar 118 is corrected such that the detected features in the sidescan sonar 118 match the detected features in the multibeam echosounding sonar 108. Errors between the two systems may be translational or rotational and are time tagged. The hull-mounted multibeam echosounding sonar 108 swath is typically in full overlap with the towed sidescan sonar 118 data.

At 218, a pattern matching algorithm is run, which finds similar detected features in both the multibeam echosounding sonar 108 and the sidescan sonar 118 data. The position biases of the sidescan sonar 118 are slowly varying based on vessel speed, length of cable, and currents in the area. This correction is then applied to the sidescan sonar 118 data and its position and rotation corrected. If the seabed is flat and the velocity of sound is well known, no other corrections are likely needed. Because different passes may go over the same object, but on different sides, the resulting images would have a similar spot (i.e., the object's location), but the shadow would, for example, look mirrored.

Sonar images may be noisy having a salt and pepper artifact. All of the time tagged error vectors are compiled and filtering is applied to remove the noise. In an embodiment, a noise reduction technique is a filtering algorithm that finds a pixel which has minimum/maximum value compared to its surrounding pixels and replaces it with the minimum/ maximum value of the surrounding pixels. If the pixel value is smaller than any value of surrounding pixels, then the value of the pixel is replaced by minimum value of those surrounding pixels. In an embodiment, each pixel of the image is replaced with the median of the neighboring pixel values. The median is calculated by first sorting all the pixel values from the surrounding neighborhood into numerical order and then replacing the pixel being considered with the middle pixel value. In an embodiment, a set value is taken and if the pixel is lower than that value it is set to white and if the pixel is higher than the value it is set to black.

At 220, the position of the sidescan sonar 118 is computed by the underwater positioning system 120. In some instances, the errors of the sidescan sonar 118 positioning can be assumed to be random with slow moving biases. The position biases of the SSS are slowly varied based on vessel speed, length of cable out and currents in the area. This correction can then be applied to the SSS data and its position and rotation corrected.

At 222, the operation of the sidescan sonar 118 may be controlled by a controller located on the towing vessel 102 and/or a controller located on the towed vehicle 104. The controller located on the towing vessel 102 and the controller located on the towed vehicle 104 may communicate via a communication link. The controller located on the towed vehicle 104 may control the operation of the sonar source and collects the data from the array of sensors in the sidescan sonar 118. The controller located on the towed vehicle 104 may transmit the data via the communication link to the controller located on the towing vessel 102. The controller located on the towing vessel 102 may direct the overall operation of the sidescan sonar 118. In an embodiment, based on parameters related to the towing speed, the towing cable length, and the required survey/tow depth, the controller located on the towing vessel 102 can calculate the amount of activation of the thruster system.

The sidescan sonar 118 can use a fixed-length moving array of receivers to cover different parts of the seabed 114. The sidescan sonar 118 may have one or a few beams 112, and an image is produced by moving the sonar and using repeated pulses. The resulting data captured for a single pulse from either a multibeam echosounding sonar 108 and sidescan sonar 118 are digital echo amplitudes each having an associated range and angle of incidence.

In an embodiment, where the seabed is sloping (e.g., not flat), the sidescan sonar 118 data may be stretched to make the detected features at the edge of the swath collocate with the multibeam echosounding sonar 108. This may also correct any errors induced by sound velocity error. In an embodiment, where the sidescan sonar 118 is not positioned at nadir correctly and the seabed model is known, the actual shape of the seabed can be applied to position the sidescan sonar 118 data into the map.

At 224, the position of the sidescan sonar 118 on the towed vehicle 104 is corrected by referencing sensor data from the multibeam echosounding sonar 108 on the towing vessel 102. The heading of the sidescan sonar 118 on the towed vehicle 104 is corrected by referencing sensor data from the multibeam echosounding sonar 108 on the towing vessel 102.

Figure 3:
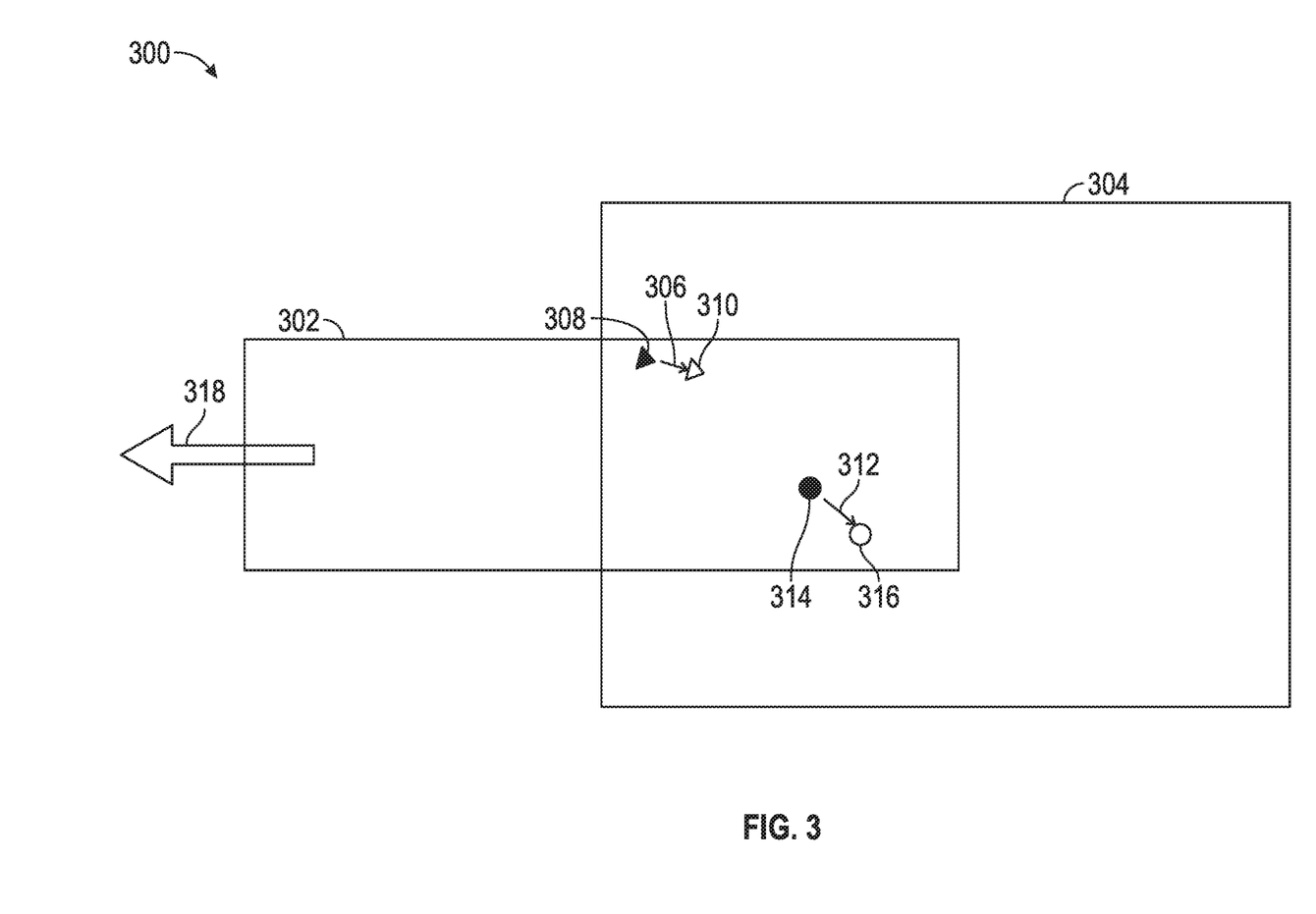
FIG. 3 is a schematic diagram illustrating error vectors for correcting the position of a sensor using towing vessel with a towed vehicle, in accordance with various aspects of the subject technology.

FIG. 3 illustrates the error vectors for correcting the positions of the sidescan sonar and multibeam echosounding sonar 300, in accordance with various aspects of the subject technology. At any one point, there are error vectors between the data set of the sidescan sonar 118 and the multibeam echosounding sonar 108. Errors can generally be assumed to be in the sidescan sonar 118 data position. In an embodiment, error vectors point into the same direction with similar amplitudes in an area, which is translated into a positional error at the time of feature matching. If there are error vectors on opposite sides of the sidescan sonar 118 nadir that are in opposite directions, this can be interpreted as a rotational error at the time of sampling.

Area 302 represents the swath coverage of the multibeam echosounding sonar 108 and area 304 represents the swath coverage of the sidescan sonar 118. Shaded triangle 308 and shaded circle 314 correlate to the sidescan sonar 118 data that is observed. Unshaded triangle 310 and unshaded circle 316 correlate to the multibeam echo sounding sonar 108 data that is observed. Error vector 306 correlates to the shaded triangle 308 and the unshaded triangle 310 and indicates how the position of the sidescan sonar 118 is to be adjusted. Error vector 312 correlates to the shaded circle 314 and the unshaded circle 316 and indicates how the position of the sidescan sonar 118 is to be adjusted. In an embodiment, error vector 306 is shorter than error vector 312, which indicates that there can be a heading error and the heading of the sidescan sonar 118 needs to be adjusted. In an embodiment, error vector 306 is on the starboard of the towed vehicle and error vector 312 is on the port side.

Figure 4A:
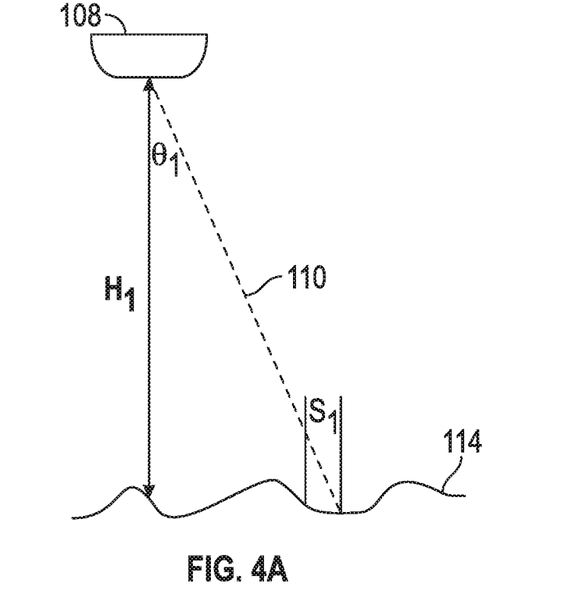
FIGS. 4A and 4B are a schematic diagram illustrating a sidescan sonar and a multibeam echo sounding sonar, in accordance with various aspects of the subject technology.

Turning to FIG. 4A, a schematic diagram illustrating the multibeam echo sounding sonar is provided, in accordance with various aspects of the subject technology. Sonar images have dead zones of data where the signal was blocked by terrain, which are called shadows. The shadow extends perpendicular to and in the direction away from the multibeam echosounding sonar 108. The multibeam echosounding sonar 108 is near the surface of the water at a height of H1, which leaves virtually no shadow S1 behind the detected feature. The data captured for a single pulse from the multibeam echosounding sonar 108 are digital echo amplitudes each having an associated angle of incidence of θ1. The seabed 114 is generally not flat and its topography is described by a set of normal vectors each orthogonal to an element at a survey point on the seabed 114. The angle of incidence θ1 at any survey point on the seabed 114 is the angle in three dimensions between the beam 110 and the normal vector at that survey point.

Figure 4B:
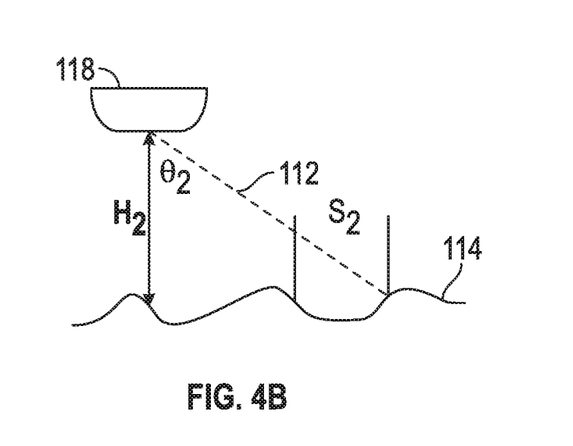

Turning to FIG. 4B, a schematic diagram illustrating the sidescan sonar is provided, in accordance with various aspects of the subject technology. The shadow extends perpendicular to and in the direction away from the sidescan sonar 118. The sidescan sonar 118 is closer to the seabed 114 at a height of H2. The sidescan sonar 118 leaves behind a relatively large shadow S2 because the sidescan sonar 118 is much closer to the feature, than multibeam echosounding sonar 108. Matching the patterns of the multibeam echosounding sonar 108 with the sidescan sonar 118 allows the system to find smaller less obvious features. The data captured for a single pulse from the sidescan sonar 118 are digital echo amplitudes each having an associated angle of incidence of θ2. The angle of incidence θ2 at any survey point on the seabed 114 is the angle in three dimensions between the beam 112 and the normal vector at that survey point.

Other shipboard instrumentation, such as accelerometers, inertial systems, and doppler velocity, provide data for several variables pertaining not only to the pulse and its echo but also to the motion of the vessel or the towfish. These variables include the course, velocity, roll, pitch and heave of the vessel. This information is used to relate the survey data to a geographic position on the surface of the Earth and to adjust all angles measured relative to the axes of the vessel for the vessel's movement along its course, with due correction for wind, current and wave buffeting, relative to the Earth's surface.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of correcting sensor position, the method comprising:
    transmitting one or more first pulses of a first frequency range towards a first portion of a seabed;
    receiving a first set of backscattered data;
    transmitting one or more second pulses of a second frequency range towards a second portion of the seabed;
    receiving a second set of backscattered data;
    processing the first set of backscattered data and the second set of backscattered data to form a first set of image data and a second set of image data;
    comparing the first set of image data and the second set of image data;
    creating one or more error vectors between the first set of image data and the second set of image data wherein the one or more error vectors indicate a positional error and a rotational error; and
    updating the first set of backscattered data based on the one or more error vectors to produce an updated set of image data.

2. The method of claim 1, wherein the one or more first pulses are transmitted by a sidescan sonar and the one or more second pulses are transmitted by a multibeam echo-sounding sonar.

3. The method of claim 2, wherein the sidescan sonar is towed by a towing vessel.

4. The method of claim 3, wherein the multibeam echo-sounding sonar is mounted beneath the towing vessel.

5. The method of claim 4, wherein the sidescan sonar is connected by a towing cable.

6. The method of claim 1, wherein transmitting the one or more first pulses of the first frequency range is done at the same time as transmitting the one or more second pulses of the second frequency range.

7. The method of claim 1, wherein comparing the first set of image data and the second set of image data comprises running a pattern matching algorithm to determine one or more similar features between the first set of image data and the second set of image data.

8. The method of claim 1, wherein the first portion of the seabed and the second portion of a seabed overlap.

9. The method of claim 1, further comprising rendering an image of a topography of the seabed based on the updated set of image data.

10. A system of correcting sensor position, the system comprising:
    a towing vessel;
    a towing cable connected to the towing vessel;
    a sidescan sonar towed by the towing vessel, the sidescan sonar transmitting one or more first pulses of a first frequency range towards a first portion of a seabed; and
    a multibeam echo sounding sonar mounted beneath the towing vessel, the multibeam echo sounding sonar transmitting one or more second pulses of a second frequency range towards a second portion of the seabed,
    wherein in response to receiving backscattered data in response to transmitting the one or more first and second pulses, creating one or more error vectors indicate a positional error and a rotational error.

11. The system of claim 10, wherein the towing vessel tows the sidescan sonar at a desired depth near the seabed.

12. The system of claim 10, wherein the multibeam echo sounding sonar is at a predetermined distance ahead of the sidescan sonar.

13. The system of claim 10, wherein transmitting the one or more first pulses of the first frequency range is concurrent with transmitting the one or more second pulses of the second frequency range.

14. The system of claim 10, wherein transmitting the one or more first pulses of the first frequency range returns a first set of backscattered data of the backscattered data that is processed into a first set of image data.

15. The system of claim 14, wherein transmitting the one or more second pulses of the second frequency range returns a second set of backscattered data of the backscattered data that is processed into a second set of image data.

16. The system of claim 15, wherein the first set of image data is compared to the second set of image data by running a pattern matching algorithm to determine one or more similar features between the first set of image data and the second set of image data.

17. The system of claim 16, wherein a first set of positions based on the first set of backscattered data is updated based on the one or more error vectors.

18. The system of claim 17, wherein the one or more error vectors are between the first set of image data and the second set of image data.

* * * * *